(12) United States Patent
Wang et al.

(10) Patent No.: US 11,262,176 B2
(45) Date of Patent: Mar. 1, 2022

(54) BRACKET APPARATUS

(71) Applicant: AUTEL INTELLIGENT TECHNOLOGY CORP., LTD., Guangdong (CN)

(72) Inventors: Xiaolong Wang, Guangdong (CN); Xinguang Tang, Guangdong (CN); Jin Chen, Guangdong (CN)

(*) Notice: Subject to any disclaimer, the term of this patent is extended or adjusted under 35 U.S.C. 154(b) by 104 days.

(21) Appl. No.: 16/924,983

(22) Filed: Jul. 9, 2020

(65) Prior Publication Data

US 2020/0340793 A1     Oct. 29, 2020

Related U.S. Application Data

(63) Continuation of application No. PCT/CN2019/070774, filed on Jan. 8, 2019.

(30) Foreign Application Priority Data

Jan. 12, 2018  (CN) .......................... 201810032291.0

(51) Int. Cl.
   *G01B 5/06*     (2006.01)
   *G01B 11/27*    (2006.01)
   (Continued)

(52) U.S. Cl.
   CPC ............ *G01B 5/065* (2013.01); *G01B 11/272* (2013.01); *G01S 7/40* (2013.01); *G01S 13/931* (2013.01)

(58) Field of Classification Search
   CPC ......... G01B 5/065; G01B 11/272; G01S 7/40; G01S 13/931; G01S 7/4082;
   (Continued)

(56) References Cited

U.S. PATENT DOCUMENTS 11,119,189 B2 *  9/2021  Lai .......................... G01S 7/4004
11,154,980 B2 * 10/2021  Wang ....................... B25H 5/00
(Continued)

FOREIGN PATENT DOCUMENTS

CN         202691471 U     1/2013
CN         105715917 A     4/2016
(Continued)

OTHER PUBLICATIONS

International Seach Report dated Apr. 11, 2019; PCT/CN2019/070774.

*Primary Examiner* — Yaritza Guadalupe-McCall

(57) ABSTRACT

The present invention relates to the technical field of automobile maintenance and device calibration, and discloses a bracket apparatus, the bracket apparatus including a base, a vertical rod, and a sliding assembly. The base supports the vertical rod, the vertical rod being vertically disposed and one end thereof being mounted to the base; and the sliding assembly is movably mounted to the vertical rod and may slide along the vertical rod, and the sliding assembly is configured to carry a required calibration apparatus. In the bracket apparatus of the present invention, the sliding assembly may slide along the vertical rod, and a height of the calibration apparatus carried by the sliding assembly may be adjusted as required to meet different height requirements of different calibration apparatuses, so that the bracket apparatus may carry different calibration apparatuses for use.

19 Claims, 14 Drawing Sheets

(51) Int. Cl.
*G01S 7/40* (2006.01)
*G01S 13/931* (2020.01)

(58) Field of Classification Search
CPC .... G01S 7/4026; F16M 11/041; F16M 11/18;
F16M 11/046; F16M 2200/027; F16M
2200/08; F16M 11/04; F16M 11/24
See application file for complete search history.

(56) References Cited

U.S. PATENT DOCUMENTS

| | | | |
|---|---|---|---|
| D937,111 S * | 11/2021 | Wang | D10/103 |
| 2020/0340793 A1* | 10/2020 | Wang | G01S 7/40 |
| 2020/0341113 A1* | 10/2020 | Shen | G01S 7/4086 |
| 2020/0344466 A1* | 10/2020 | Huang | H04N 17/002 |
| 2021/0088626 A1* | 3/2021 | Lai | F16M 11/18 |

FOREIGN PATENT DOCUMENTS

| | | |
|---|---|---|
| CN | 205402147 U | 7/2016 |
| CN | 206817089 U | 12/2017 |
| CN | 108036174 A | 1/2018 |
| CN | 206861221 U | 1/2018 |
| CN | 207921657 U | 9/2018 |

* cited by examiner

BRACKET APPARATUS

This application is a continuation application of International Application No. PCT/CN2019/070774, filed on Jan. 8, 2019, which claims priority of Chinese Patent Application No. 2018100322910, filed on Jan. 12, 2018, which is incorporated herein by reference in its entirety.

BACKGROUND

Technical Field

This application relates to the technical field of automobile maintenance and device calibration, and in particular, to a bracket apparatus that can carry a calibration apparatus.

Related Art

An advanced driver assistant system (ADAS for short) is an active security technology that is used to collect environmental data inside and outside a vehicle at the first time using various sensors installed on the vehicle to perform technical processing such as identification, detection, and tracking of static and dynamic objects, so that a driver can detect a possible danger as quickly as possible, thereby attracting attention and improving security. A sensor used in the ADAS mainly includes a camera, a radar, a laser, and an ultrasonic wave, which may be used to detect light, heat, pressure, or other variables for monitoring a state of an automobile, and is usually located on front and rear bumpers, on a side mirror, inside a steering column, or on a windscreen of the vehicle. An early ADAS technology is mainly a passive alarm. When a potential danger is detected on the vehicle, an alarm is given to alert the driver to an abnormal vehicle or road condition.

With the popularity of the ADAS in the automobile, a calibration application market for an ADAS device also becomes mature, and calibration tools for different ADAS devices also enter the market. However, at present, there are many differences in the calibration devices between automobile series and even different models of a same automobile series. A basic calibration principle thereof is consistent, but for a specific model, many calibration tools with the same principle cannot be universal due to the height or other different specification parameters.

SUMMARY

In order to resolve the foregoing technical problems, embodiments of the present invention provide a bracket apparatus that may be configured carry a plurality of calibration apparatuses.

In the embodiments of the present invention, the technical problems are resolved using the following technical solutions:

A bracket apparatus is provided, including a base, a vertical rod, and a sliding assembly. The base supports the vertical rod, the vertical rod being vertically disposed and one end thereof being mounted to the base; and the sliding assembly is movably mounted to the vertical rod and may slide along the vertical rod, and the sliding assembly is configured to carry a required calibration apparatus.

Optionally, an accommodating hole is disposed on the sliding assembly for accommodating a fixed shaft of the calibration apparatus.

Optionally, a locating hole is disposed on the sliding assembly for accommodating a locating pin of the calibration apparatus.

Optionally, the sliding assembly includes a holder, the holder including a holder body, a clamping portion, a connecting rod, and a handle;

two clamping portions extend from the holder body, an accommodating hole is disposed between the two clamping portions, and there is a gap between the two clamping portions, the gap being in communication with the accommodating hole;

one end of the connecting rod penetrates through one of the clamping portions and is fixed to the other clamping portion, and the other end of the connecting rod is hinged on the handle; and a cam block and a rotation shaft are disposed on the handle, one end that is of the connecting rod and that is away from the clamping portion is connected to a central portion of the rotation shaft, two cam blocks are sleeved on both ends of the rotational shaft, and the two cam blocks may rotate relative to the rotation shaft to press against the clamping portion, so that the two clamping portions clamp the fixed shaft.

Optionally, the holder includes a compressing block, the compressing block being sleeved on the connecting rod, and the compressing block being located between the clamping portion and the cam block.

Optionally, the sliding assembly includes a clamping member, the clamping member being sleeved on the vertical rod and sliding along the vertical rod, and the clamping member clamping the vertical rod to fix the sliding assembly to a required position.

Optionally, a rack is further disposed on the vertical rod, the rack being disposed vertically;

the sliding assembly includes a self-locking member, the self-locking member including a fine adjustment knob and an adjusting gear;

the fine adjustment knob is movably mounted to the clamping member, and the fine adjustment knob may rotate relative to the clamping member; and the adjusting gear is sleeved on the fine adjustment knob, and the adjusting gear is meshed with the rack to fine adjust a height of the sliding assembly.

Optionally, the self-locking member includes a fixed rotation shaft, a pressing plate, and an elastic member;

both ends of the fixed rotation shaft being respectively mounted to the clamping member, and a central axis of the fixed rotation shaft being parallel to a rotational axis of the fine adjustment knob;

the pressing plate being sleeved on the fixed rotation shaft and the fine adjustment knob, the pressing plate rotating around the fixed rotation shaft to drive the fine adjustment knob to move relative to the clamping member, so that the gear is separated from the rack; and the elastic member being compressed between the pressing plate and the clamping member, to provide recovery elasticity for the pressing plate, so that the adjusting gear compresses the rack.

Optionally, the pressing plate includes a pressing plate body and a mounting ear;

two mounting ears extending from the pressing plate body, the pressing plate body is sleeved on the fixed rotation shaft; and the two mounting ears being sleeved on the fine adjustment knob, and the adjusting gear being located between the two mounting ears.

Optionally, the clamping member includes a first clamping plate, a second clamping plate, and a locking knob;

the first clamping plate and the second clamping plate being respectively located at two opposite sides of the vertical rod and respectively abutting against the vertical rod; and one end of the locking knob penetrating through the first clamping plate, and the locking knob being engaged with the first clamping plate through threads, and when the locking knob is rotated, the locking knob penetrating through one end of the first clamping plate and abutting against the vertical rod, so that the clamping member is fixed to the vertical rod.

Optionally, the clamping member includes a friction pad and a pad screw;

the friction pad being disposed between the first clamping plate and the vertical rod for increasing friction between the first clamping plate and the vertical rod; and one end of the pad screw penetrating through the first clamping plate and abutting against the friction pad, and when the pad screw is rotated, a degree of contact between the friction pad and the vertical rod being adjusted, so as to adjust friction between the friction pad and the vertical rod.

Optionally, the base includes a base body, a horizontal adjustment member, and a gradienter;

one end of the vertical rod being fixedly mounted to the base body;

the horizontal adjustment member being mounted to the base body fir adjusting a horizontal angle of the base body; and the gradienter being mounted to the base body for detecting whether the base body is horizontally disposed.

Optionally, the base includes a supporting member, one end of the supporting member being fixedly mounted to a lower surface of the base body, and there being at least one supporting member, where one intersection point formed through intersection of one supporting member and the lower surface, and two intersection points formed respectively through intersection of the two horizontal adjustment members and the lower surface are respectively located at three vertexes of an isosceles triangle.

Optionally, there are three supporting members, where the three supporting members are arranged orderly along a first straight line; and the two horizontal adjustment members are arranged orderly along a second straight line, and the first straight line is parallel to the second straight line.

Optionally, the horizontal adjustment member includes a handle and a screw portion;

the handle being fixedly mounted to one end of the screw portion, and the handle being located over the base body to facilitate rotation of the horizontal adjustment member; and the screw portion penetrating through the base body, the screw portion being engaged with the base body through threads, and the screw portion being vertically disposed.

Optionally, there are at least three horizontal adjustment members, where the three horizontal adjustment members respectively intersect the lower surface of the base body to form three intersection points, the three intersection points being respectively located at three vertexes of an isosceles triangle.

Optionally, the gradienter is mounted to an upper surface of the base body, and the gradienter includes a first horizontal bead and a second horizontal bead, the first horizontal bead being perpendicular to the second horizontal bead.

Optionally, a first calibration line, a second calibration line, and a third calibration line are disposed on the upper surface of the base body;

the first calibration line and the second calibration line being located on a same straight line; and the third calibration line being perpendicular to the first calibration line and the second calibration line, and a straight line on which the third calibration line is located passing through an intersection point of the vertical rod and the base body.

Optionally, a first calibration line and a third calibration line are disposed on an upper surface of the base body; and the third calibration line being perpendicular to the first calibration line, where a straight line on which the third calibration line is located passes through an intersection point of the vertical rod and the base body.

Optionally, the third calibration line is parallel to a central axis of the accommodating hole, and the third calibration line and the central axis of the accommodating hole are located in a same vertical plane.

Optionally, a height gauge is disposed for the vertical rod for measuring a moving distance or a height of the sliding assembly.

In comparison to the prior art, in the bracket apparatus of the present invention, the sliding assembly may slide along the vertical rod, and a height of the calibration apparatus carried by the sliding assembly may be adjusted as required to meet different height requirements of different calibration apparatuses, so that the bracket apparatus may carry different calibration apparatuses for use.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. The terms "vertical", "horizontal", "left", "right", "inside", "outside", and similar expressions, as used in this specification, are for the purpose of description only.

Unless otherwise defined, all technical and scientific terms used herein have the same meaning as commonly understood by one of ordinary skill in the art to which the present invention belongs. The terms used in the specification of the present invention are merely used for describing specific embodiments, and are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
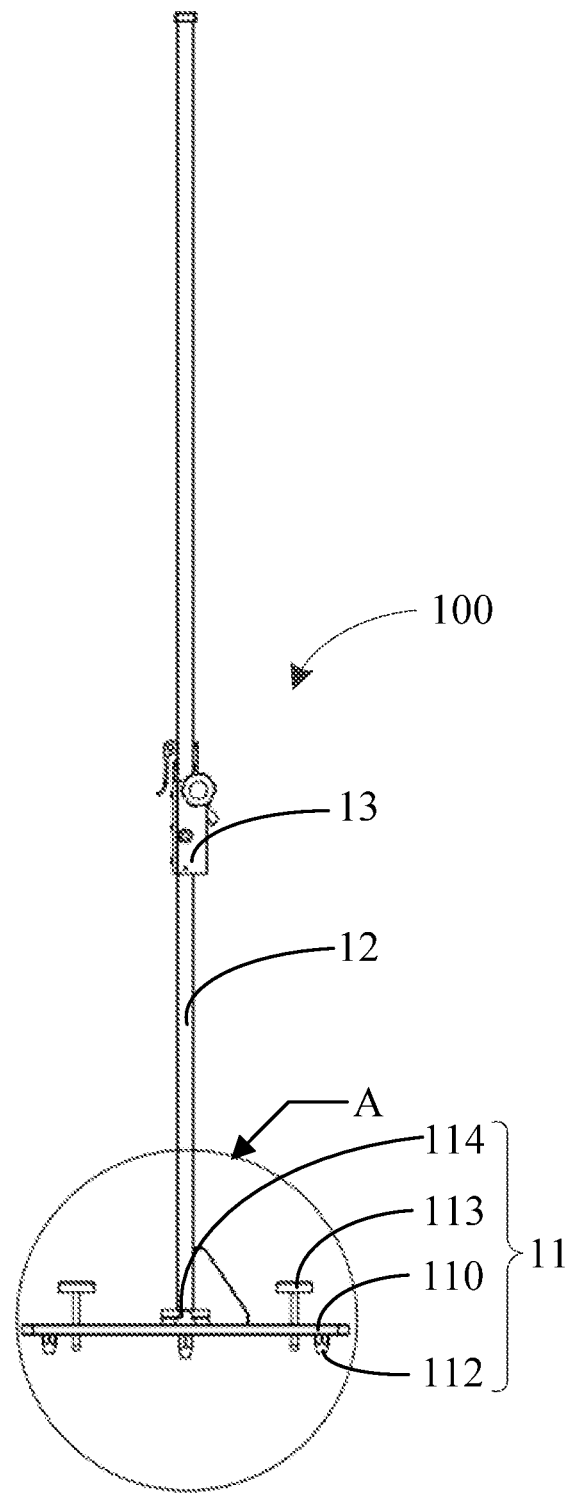
FIG. 1 is a three-dimensional diagram of a bracket apparatus according to an embodiment of the present invention.
Figure 2:
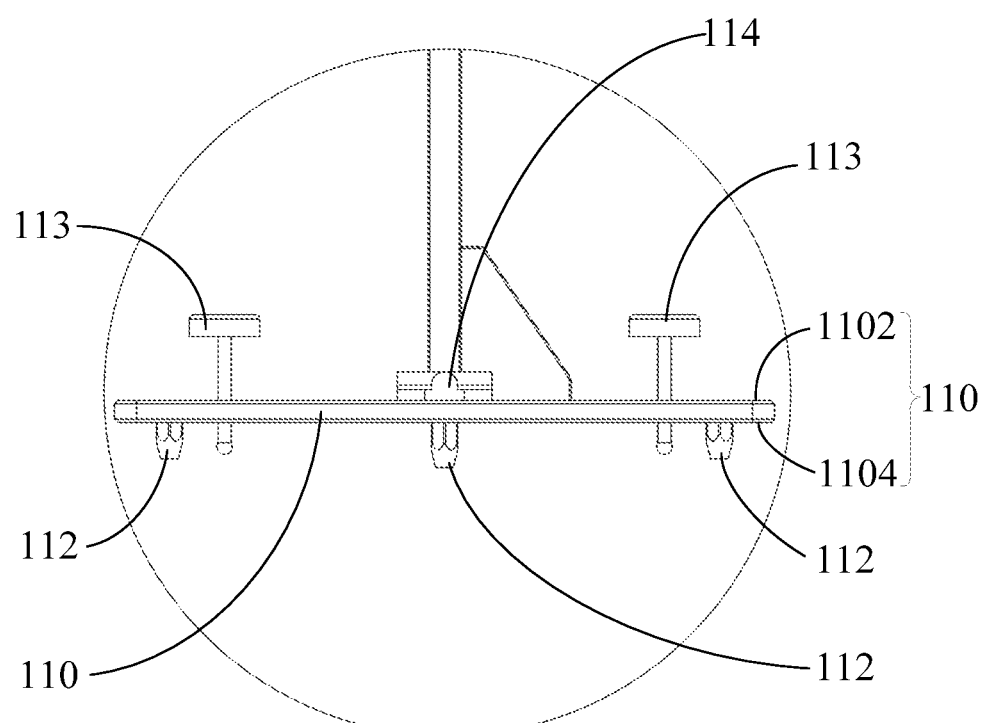
FIG. 2 is a partial enlarged diagram of a portion A in FIG. 1.

Referring to both FIG. 1 and FIG. 2, a bracket apparatus 100 provided in an embodiment of the present invention includes a base 11, a vertical rod 12, and a sliding assembly 13. The vertical rod 12 is vertically disposed, one end thereof being fixedly mounted to the base 11. The sliding assembly 13 is movably mounted to the vertical rod 12, and the sliding assembly 13 may slide along the vertical rod 12.

The base 11 includes a base body 110, a supporting member 112, a horizontal adjustment member 113, and a gradienter 114.

The base body 110 is a rectangular plate and may be made of a metal material with a large mass, so that the bracket apparatus 10 has a low center of gravity to stably support a calibration apparatus such as a laser-corner reflecting apparatus 200 (referring to FIG. 10) that is connected to the sliding assembly 13. The base body 110 includes an upper surface 1102 and a lower surface 1104.

Figure 3:
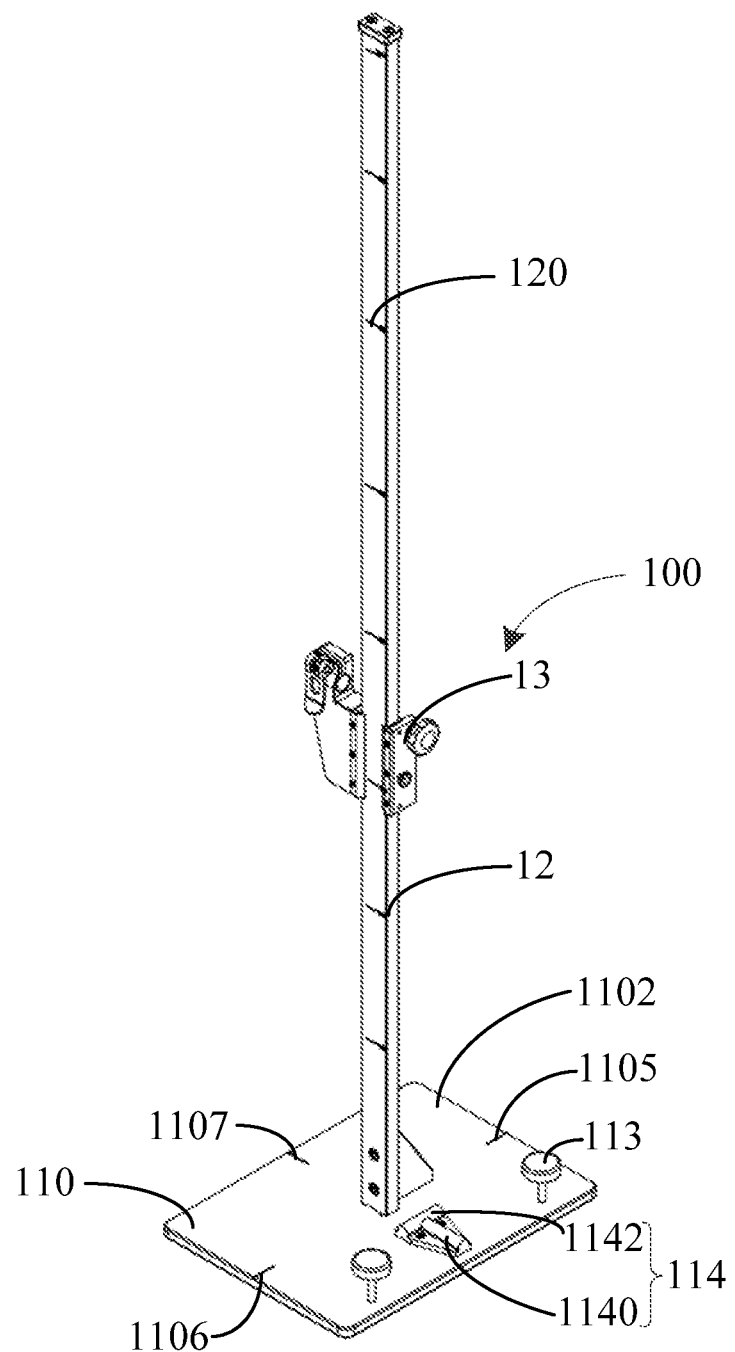
FIG. 3 is a three-dimensional diagram of a bracket apparatus shown in FIG. 1 from another perspective.
Figure 4:
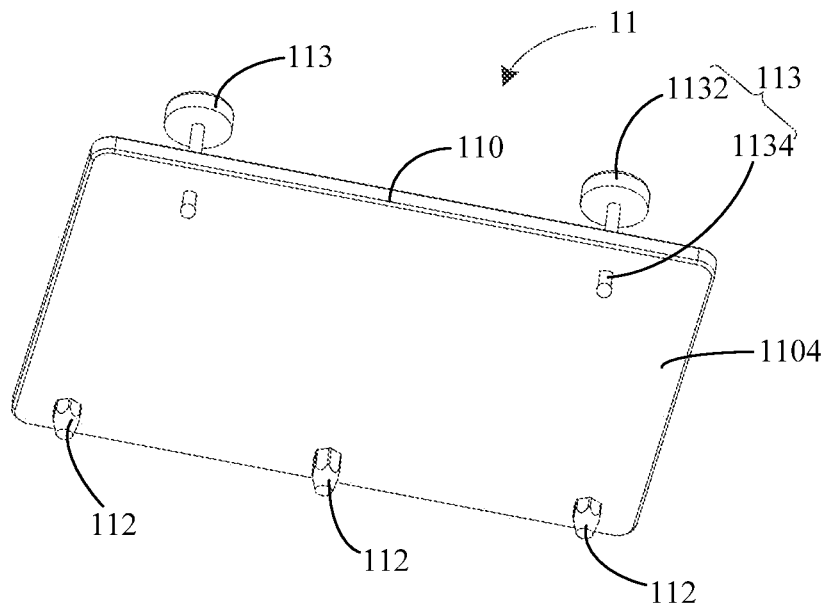
FIG. 4 is a three-dimensional diagram of a base of a bracket apparatus shown in FIG. 1.

Referring to both FIG. 3 and FIG. 4, a first calibration line 1105, a second calibration line 1106, and a third calibration line 1107 are disposed on the upper surface 1102. The first calibration line 1105 and the second calibration line 1106 are located on a same straight line. The third calibration line 1107 is perpendicular to the first calibration line 1105 and the second calibration line 1106. It may be understood that, in some other embodiments, either or both of the first calibration line 1105 and the second calibration line 1106 may be omitted, that is, either of the first calibration line 1105 or the second calibration line 1106 is disposed on the upper surface 1102, or neither of the first calibration line 1105 or the second calibration line 1106 is disposed on the upper surface.

Definitely, a fourth calibration line (not shown in the figure) may further be disposed on the upper surface 1102, the fourth calibration line and the third calibration line 1105 being located on a same straight line, which is not limited thereto.

The supporting member 112 is disposed on the lower surface 1104, and the supporting member 112 is substantially columnar and vertically disposed. One end of the supporting member 112 is fixedly mounted to the lower surface 1104. The three supporting members 112 are arranged orderly along a first straight line. The first straight line is parallel to the first calibration line 1105 and the second calibration line 1106.

A horizontal adjustment member 113 includes a handle 1132 and a screw portion 1134. The handle 1132 is fixedly mounted to one end of the screw portion 1134. The screw portion 1134 penetrates through the upper surface 1102 and the lower surface 1104. The screw portion 1134 is engaged with the base body 110 through threads, and the screw portion 1134 is vertically disposed. The handle 1132 is located over the upper surface 1102 to facilitate rotation of the horizontal adjustment member 113, so that the horizontal adjustment member 113 moves relative to the base body 110 along a vertical direction, so as to adjust depression and elevation angles of the base body 110. Two horizontal adjusting members 113 are arranged orderly along a second straight line. The first straight line is parallel to the second straight line. One intersection point formed through intersection of one of the supporting members 112 and the lower surface 1104 and two intersection points formed respectively through intersection of the two horizontal adjustment members 113 and the lower surface 1104 are respectively located at three vertexes of an isosceles triangle.

It may be understood that, in some other embodiments, a quantity of the supporting members 112 may be increased or decreased according to an actual requirement, but there must be at least one supporting member, and one intersection point formed through intersection of one of the supporting members 112 and the lower surface 1104 and two intersection points formed respectively through intersection of the two horizontal adjustment members 113 and the lower surface 1104 are respectively located at the three vertexes of the isosceles triangle.

It may be understood that, in some other embodiments, the horizontal adjustment member 113 may be other structures as long as the structures can adjust depression and elevation angles of the base body 110. There may also be at least three horizontal adjustment members 113, and the supporting member 112 is omitted. In addition, the three horizontal adjustment members 113 respectively intersect the lower surface 1104 of the base body 110 to form three intersection points, the three intersection points being respectively located at the three vertexes of the isosceles triangle.

A gradienter 114 is mounted to the upper surface 1102 for detecting whether the base body 110 is horizontally disposed. The gradienter 114 includes a first horizontal bead 1140 and a second horizontal bead 1142, the first horizontal bead 1140 being perpendicular to the second horizontal bead 1142. It may be understood that, in some other embodiments, the gradienter 114 may also be other structures as long as the structures can be used to detect whether the base body 110 is horizontally disposed.

One end of the vertical rod 12 is fixedly mounted to the upper surface 1102, and the vertical rod 12 is perpendicular to the base body 110. A straight line on which the third calibration line 1107 is located passes through an intersection point of the vertical rod 12 and the base body 110. A height gauge 120 is disposed for the vertical rod 12 for measuring a moving distance or a height of the sliding assembly 13. A rack 122 is further disposed on the vertical rod 12, the rack 122 being disposed along a vertical direction (see FIG. 8).

Figure 5:
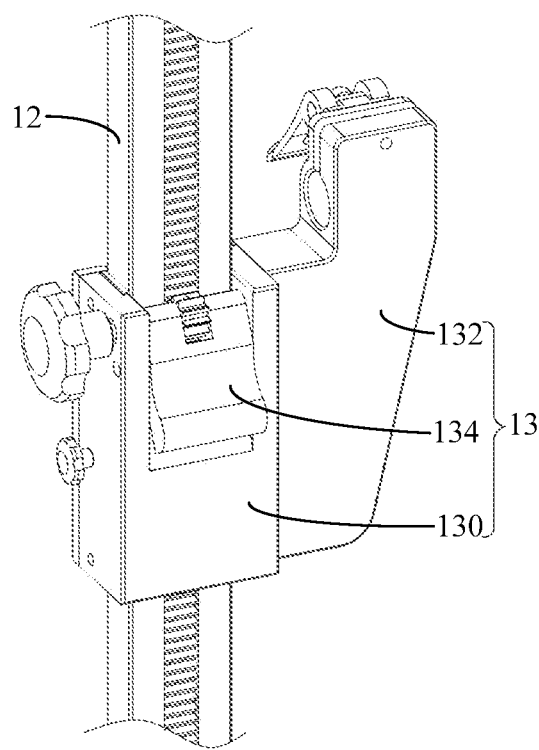
FIG. 5 is a schematic assembly diagram of a sliding assembly and a vertical rod of a bracket apparatus shown in FIG. 1.

Referring to FIG. 5, the sliding assembly 13 is made of an elastic material, for example, a metal material or a plastic material, etc. The sliding assembly 13 includes a clamping member 130, a holder 132, and a self-locking member 134. The clamping member 130 is sleeved on the vertical rod 12, may slide along the vertical rod 12, and may clamp the vertical rod 12 to fix the sliding assembly 13 to a required position. The holder 132 is fixedly mounted to the clamping member 130 for supporting a to-be-installed calibration apparatus. The self-locking member 134 is mounted to the clamping member 130 for switching between large-stroke adjustment of a height of the sliding assembly 13 and fine adjustment of the height of the sliding assembly 13.

Figure 6:
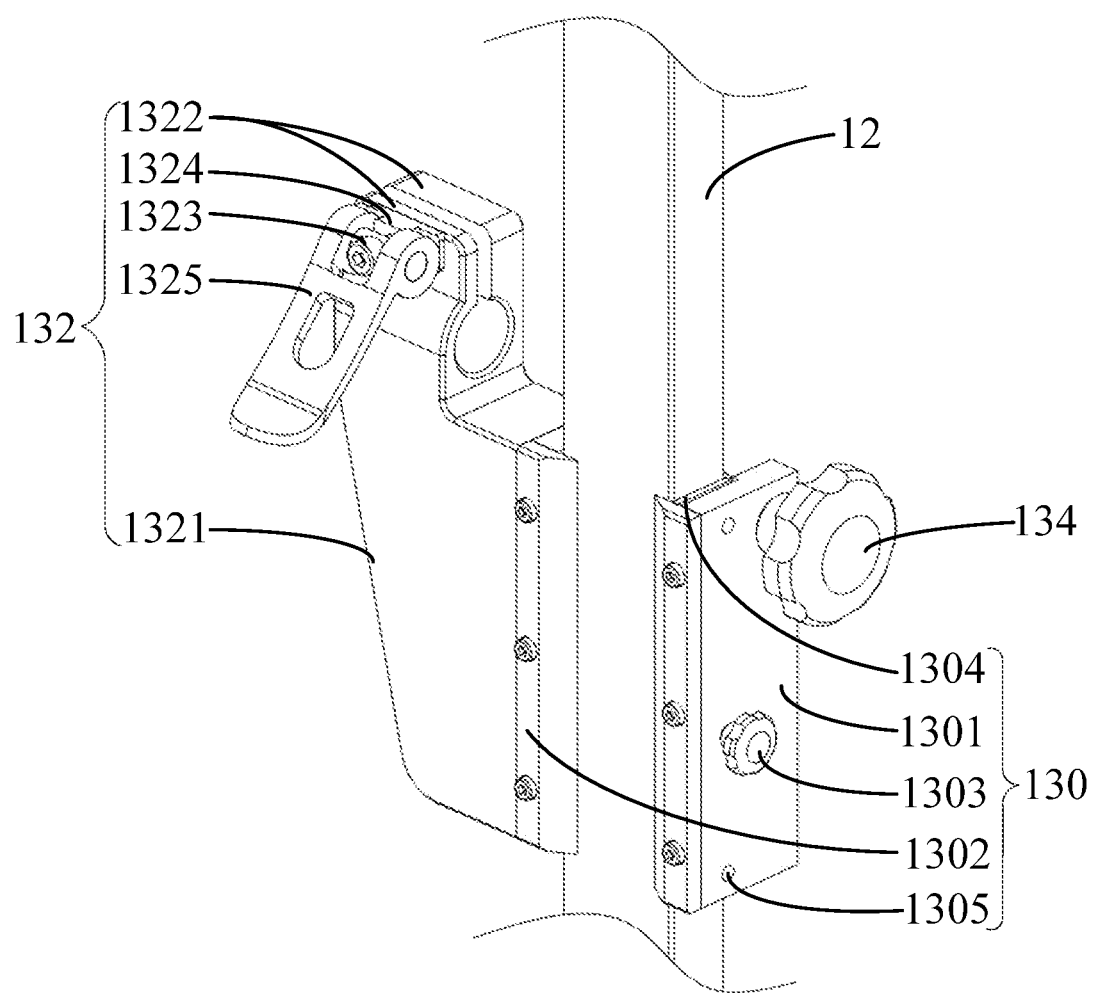
FIG. 6 is a schematic assembly diagram of a sliding assembly and a vertical rod of a bracket apparatus shown in FIG. 1 from another perspective, a handle of the sliding assembly being cocked.

Referring to FIG. 6, the clamping member 130 includes a first clamping plate 1301, a second clamping plate 1302, a locking knob 1303, a friction pad 1304, and a pad screw 1305.

The first clamping plate 1301 is connected to the second clamping plate 1302, and the first clamping plate 1301 and the second clamping plate 1302 are respectively located at two opposite sides of the vertical rod 12 and respectively abut against the vertical rod 12.

One end of the locking knob 1303 penetrates through the first clamping plate 1301, and the locking knob 1303 is engaged with the first clamping plate 1301 through threads. The locking knob 1303 is rotated to enable the locking knob 1303 to penetrate through one end of the first clamping plate 1301 and abut against the vertical rod 12, so that the clamping member 130 is fixed to the vertical rod 12.

The friction pad 1304 is disposed between the first clamping plate 1301 and the vertical rod 12 for increasing friction between the first clamping plate 1301 and the vertical rod 12.

There are two pad screws 1305, and one end of each of the pad screws 1305 penetrates through the first clamping plate 1301 and abuts against the friction pad 1304. The pad screw 1305 is rotated to adjust a degree of contact between the friction pad 1304 and the vertical rod 12, so as to adjust friction between the friction pad 1304 and the vertical rod 12. In this embodiment, the friction between the friction pad 1304 and the vertical rod 12 may be adjusted as required, so that the sliding assembly 13 may smoothly slide relative to the vertical rod 12. It may be understood that, in some other embodiments, the friction pad 1304 and the pad screw 1305 may be omitted.

Figure 7:
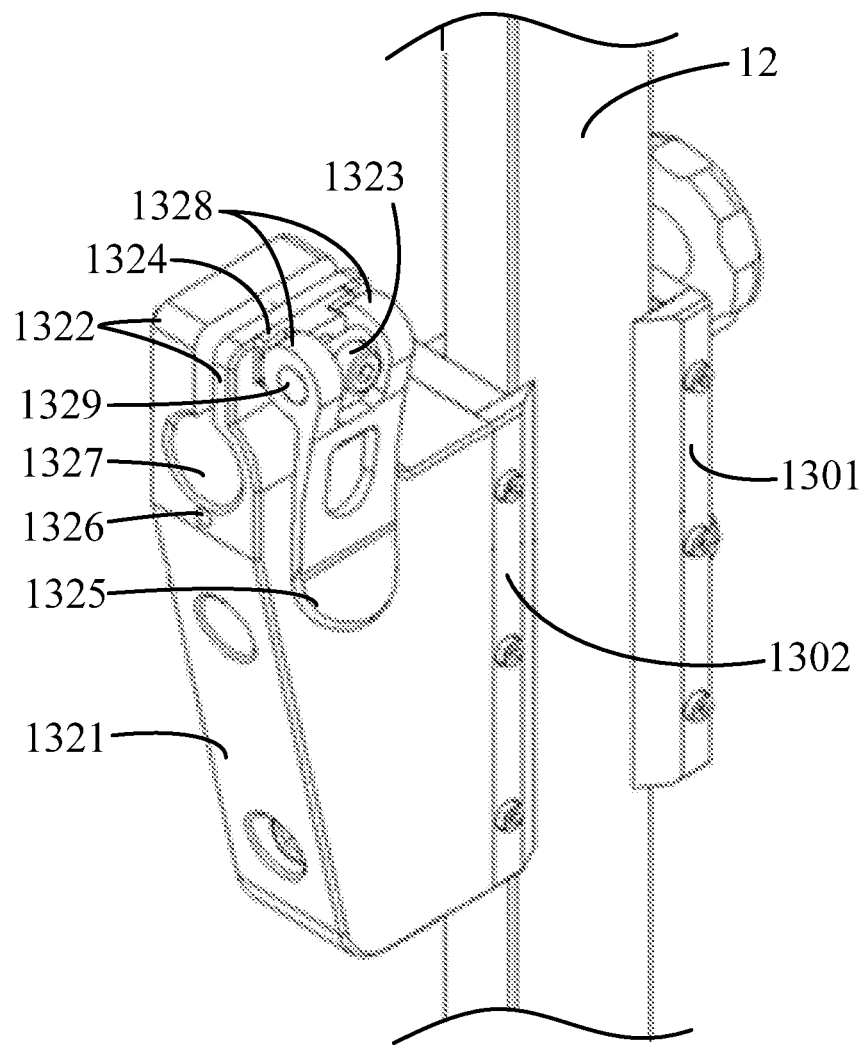
FIG. 7 is a three-dimensional assembly diagram of a sliding assembly and a vertical rod of a bracket apparatus shown in FIG. 1 from still another perspective, the handle being pressed down.
Figure 8:
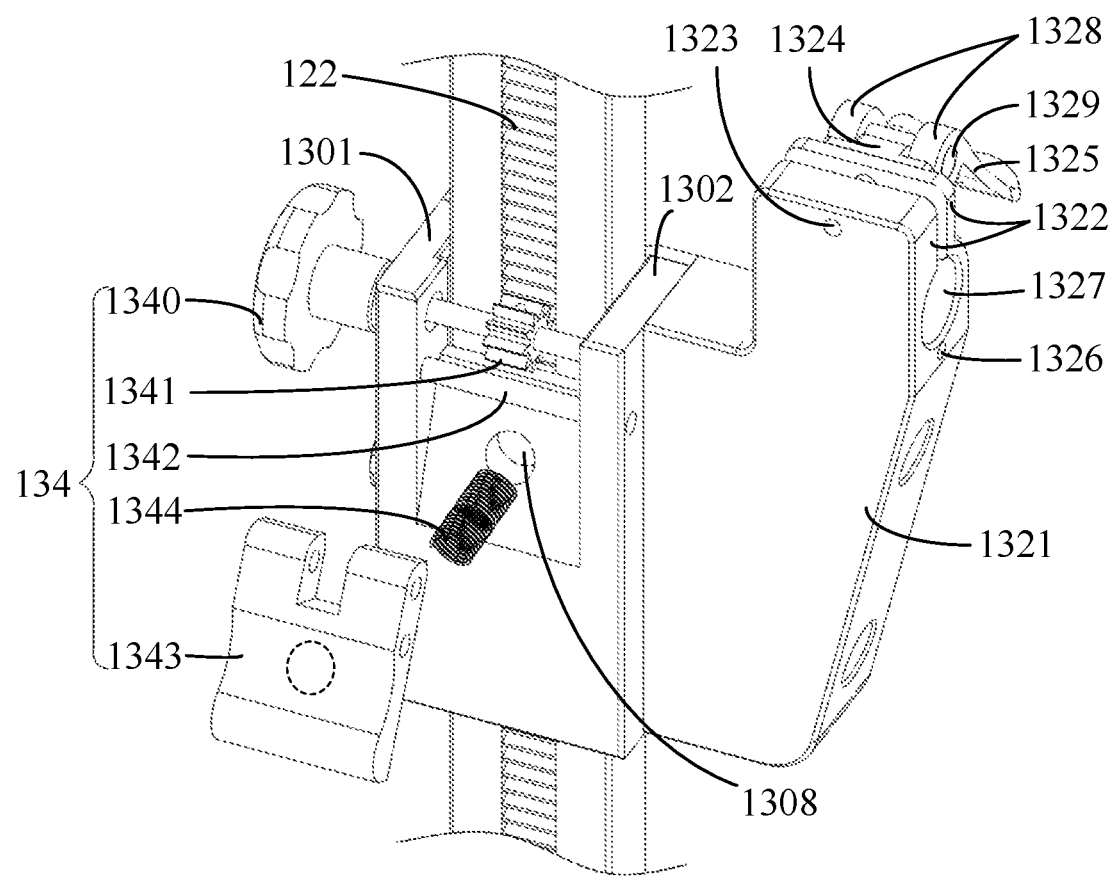
FIG. 8 is a partial exploded diagram of a sliding assembly of a bracket apparatus shown in FIG. 1.

With reference to FIG. 6 and referring to both FIG. 7 and FIG. 8, the holder 132 includes a holder body 1321, a clamping portion 1322, a connecting rod 1323, a compressing block 1324, and a handle 1325.

The holder body 1321 is fixedly connected to the second clamping plate 1302, and a locating hole 1326 is disposed on the holder body 1321.

Two clamping portions 1322 extend from the holder body 1321, an accommodating hole 1327 is disposed between the two clamping portions 1322, and there is a gap between the two clamping portions 1322, the gap being in communication with the accommodating hole 1327. The locating hole 1326 and the accommodating hole 1327 are both cylindric and horizontally disposed. A central axis of the locating hole 1326 and a central axis of the accommodating hole 1327 are both parallel to the third calibration line 1107, and the central axis of the locating hole 1326, the central axis of the accommodating hole 1327, and the third calibration line 1107 are located in a same vertical plane.

One end of the connecting rod 1323 penetrates through one of the clamping portions 1322 and is fixed to the other clamping portion 1322, and the other end of the connecting rod 1323 is hinged on the handle 1325. The compressing block 1324 is sleeved on the connecting rod 1323, and the compressing block 1324 is located between the clamping portion 1322 and the handle 1325. The compressing block 1324 may be made of a metal material, for example, copper.

A cam block 1328 and a rotation shaft 1329 are disposed on the handle 1325. One end that is of the connecting rod 1323 and that is away from the clamping portion 1322 is connected to a central portion of the rotation shaft 1329. Two cam blocks 1328 are sleeved on both ends of the rotation shaft 1329, the two cam blocks 1328 may rotate relative to the rotation shaft 1329, and the two cam blocks 1328 are parallel to each other and are spaced apart by a preset distance.

The handle 1325 is pressed to enable the two cam blocks 1328 to rotate around the rotation shaft 1329. During rotation of the cam blocks 1328, the cam blocks 1328 compress the compressing block 1324 to enable the two clamping portions 1322 to move toward each other, and the accommodating hole 1327 is narrowed to clamp the to-be-installed calibration apparatus (see FIG. 7). The handle 1325 is cocked to enable the two cam blocks 1328 to rotate oppositely around the rotation shaft 1329, the cam blocks 1328 release squeezing of the compressing block 1324, the two clamping portions 1322 move oppositely, and the accommodating hole 1327 is enlarged to take the to-be-installed calibration apparatus down from the holder 132 (see FIG. 6). With the holder 132 of this embodiment, the to-be-installed calibration apparatus may be conveniently and rapidly installed or dismantled. In addition, the compressing block 1324 is disposed between the clamping portion 1322 and the handle 1325 to increase a degree of compressing the clamping portion 1322 by the two cam blocks 1328, so that the two clamping portions 1322 may more firmly clamp the calibration apparatus.

It may be understood that, in some other embodiments, the compressing block 1324 may be omitted, and the two cam blocks 1328 may directly compress the clamping portion 1322.

Figure 9:
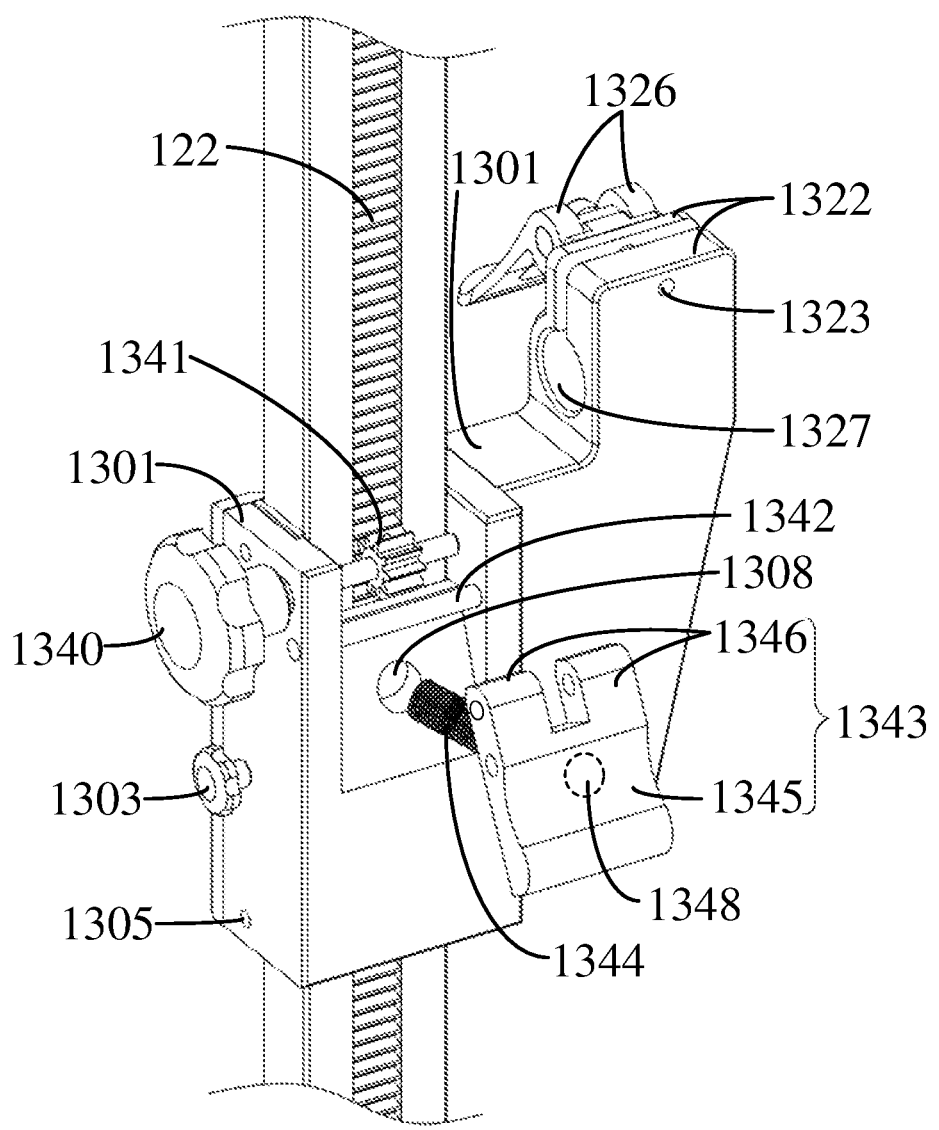
FIG. 9 is a partial exploded diagram of a sliding assembly of a bracket apparatus shown in FIG. 1 from another perspective.

Referring to both FIG. 8 and FIG. 9, the self-locking member 134 includes a fine adjustment knob 1340, an adjusting gear 1341, a fixed rotation shaft 1342, a pressing plate 1343, and an elastic member 1344.

One end of the fine adjustment knob 1340 is movably mounted to the second clamping plate 1302 after penetrating through the first clamping plate 1301. The fine adjustment knob 1340 may rotate relative to the first clamping plate 1301 and the first clamping plate 1302, and may move in parallel relative to the first clamping plate 1301 and the first clamping plate 1302.

The adjusting gear 1341 is sleeved on the fine adjustment knob 1340 and located between the first clamping plate 1301 and the second clamping plate 1302, and the adjusting gear 1341 is meshed with the rack 122.

Both ends of the fixed rotation shaft 1342 are respectively fixedly mounted to the first clamping plate 1301 and the first clamping plate 1302, and a central axis of the fixed rotation shaft 1342 is parallel to a rotational axis of the fine adjustment knob 1340.

The pressing plate 1343 includes a pressing plate body 1345 and a mounting ear 1346. A first mounting hole 1348 is disposed on the pressing plate body 1345. Two mounting ears 1346 extend from the pressing plate body 1345, and the two mounting ears 1346 are spaced apart by a preset distance and disposed in parallel. The pressing plate body 1345 is sleeved on the fixed rotation shaft 1342, the two mounting ears 1346 are sleeved on the fine adjustment knob 1340, and the adjusting gear 1341 is located between the two mounting ears 1346.

The elastic member 1344 is compressed between the pressing plate 1343 and the clamping member 130. Both ends of the elastic member 1344 are respectively accommodated in a first mounting hole 1348 of the pressing plate 1343 and a second mounting hole 1308 of the clamping member 130. In this embodiment, the elastic member 1344 is a compression spring for providing recovery elasticity. It may be understood that, in some other embodiments, the elastic member 1344 may be a spring piece or other elastic members that can provide the recovery elasticity.

When the pressing plate 1343 is pressed, the pressing plate 1343 rotates around the fixed rotation shaft 1342, the elastic member 1344 is further compressed, and the mounting ear 1346 drives the fine adjustment knob 1340 to move relative to the first clamping plate 1301 and the second clamping plate 1302, so that the gear 1341 is separated from the rack 122. In this case, the locking knob 1303 is rotated to enable the locking knob 1303 to be not in contact with the vertical rod 12, and the sliding assembly 13 may move relative to the vertical rod 12 by a large stroke. When the pressing plate 1343 is loosened, the elastic member 1344 generates the recovery elasticity to push the pressing plate 1343 to rotate reversely around the fixed rotation shaft 1342, so that the adjusting gear 1341 is meshed with the rack 122. In this case, the elastic member 1344 provides elasticity to enable the adjusting gear 1341 to press against the rack 122. The fine adjustment knob 1340 is rotated, the adjusting gear 1341 rotates and drives the rack 122 to move, so that a position of the sliding assembly 13 relative to the vertical rod 12 may be fine adjusted.

With the self-locking member 134, the height of the sliding assembly 13 may be adjusted by a large stroke, or the height of the sliding assembly 13 may be fine adjusted. It may be understood that, in some other embodiments, the fixed rotation shaft 1342, the pressing plate 1343, and the elastic member 1344 may be omitted, the adjusting gear 1341 is meshed with the rack 122, and the self-locking member 134 may only fine adjust the height of the sliding assembly 13. Alternatively, the self-locking member 134 and the rack 122 may be omitted, and the height of the sliding assembly 13 may be adjusted only by a large stroke.

Figure 10:
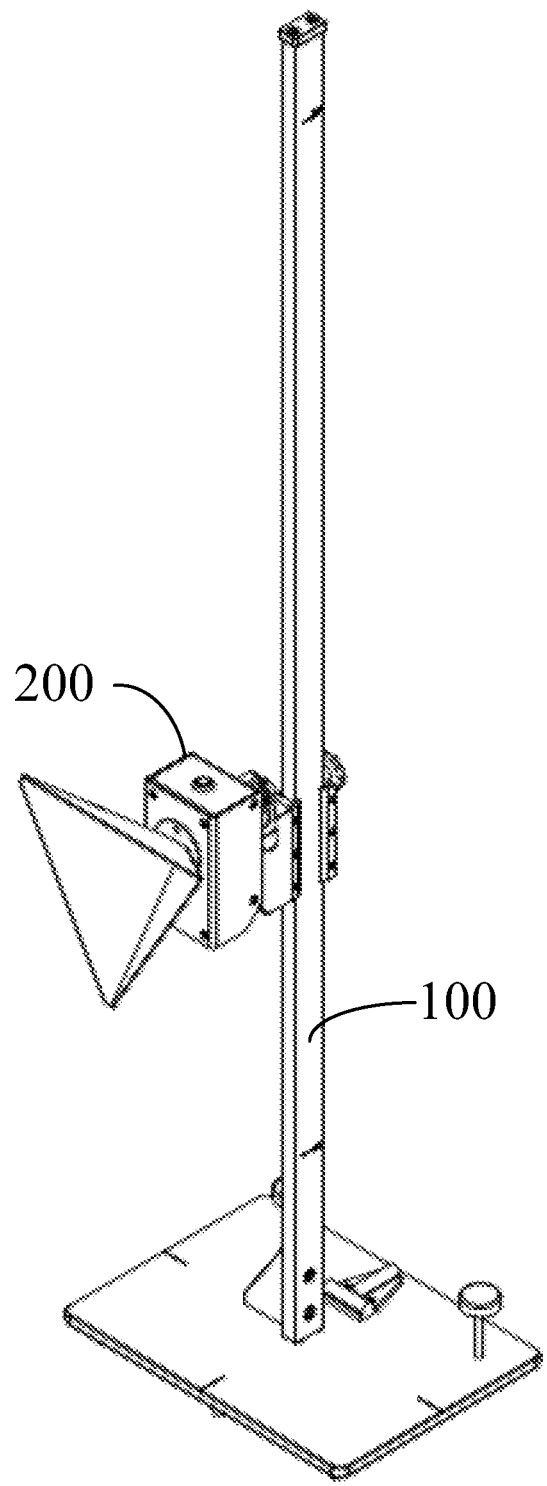
FIG. 10 is a three-dimensional diagram of a laser-corner reflecting apparatus carried by a bracket apparatus shown in FIG. 1.

Referring to FIG. 10, the bracket apparatus 100 of this embodiment may be used to support a laser-corner reflecting apparatus 200, so as to calibrate an on-board radar.

Figure 11:
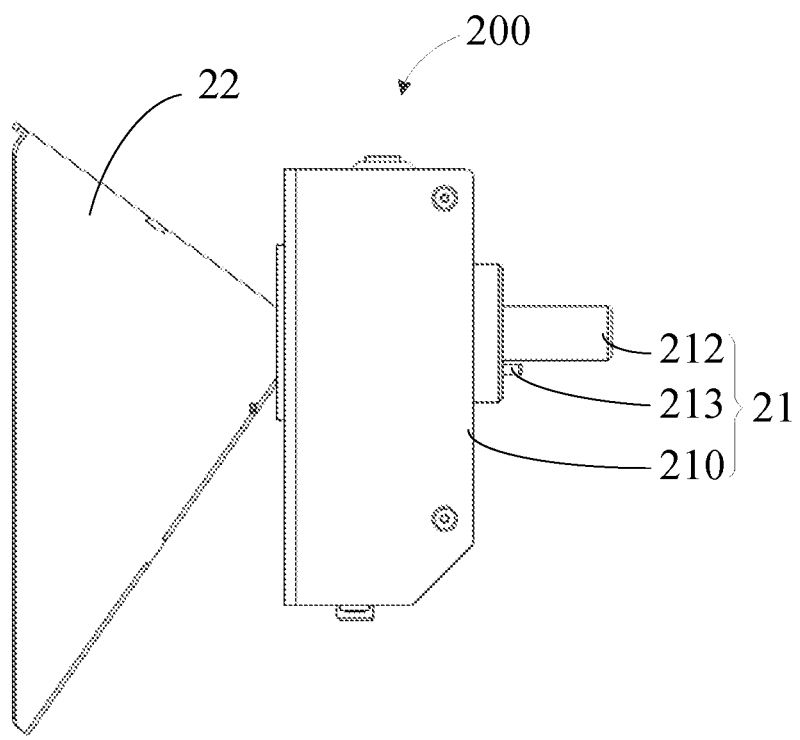
FIG. 11 is a three-dimensional diagram of a laser-corner reflecting apparatus carried by a bracket apparatus shown in FIG. 10.

Referring to FIG. 11, the laser-corner reflecting apparatus 200 includes a laser 21 and a corner reflecting plate 22. The laser 21 is configured to emit a laser, so as to align a position of the corner reflecting plate 22 with that of the on-board radar. The corner reflecting plate 22 is mounted to the laser 21 to reflect a radar wave emitted from any direction, so that the radar wave returns along an original path, thereby calibrating an installation position and an installation angle of the on-board radar.

The laser 21 includes a laser body 210, a fixed shaft 212, and a locating pin 213. The laser body 210 is configured to emit a laser. One end of the fixed shaft 212 is fixedly connected to the laser body 210, and one end of the locating pin 213 is also fixedly connected to the laser body 210. Both the fixed shaft 212 and the locating pin 213 are cylindric, and the fixed shaft 212 and the locating pin 213 are parallel to each other and both perpendicular to the vertical rod 12. Both the fixed shaft 212 and the locating pin 213 are parallel to an emitting direction of the laser.

Referring to both FIG. 7 and FIG. 11, when the laser-corner reflecting apparatus 200 is mounted to the holder 132, the fixed shaft 212 is inserted into the accommodating hole 1327, and the locating pin 213 is inserted into the locating hole 1326. The handle 1325 is pressed to enable the two cam blocks 1328 to press against the compressing block 1324, so that the two clamping portions 1322 move toward each other, and the accommodating hole 1327 is narrowed to clamp the fixed shaft 212, so that the laser-corner reflecting apparatus 200 may be conveniently fixed to the holder 132.

When the laser-corner reflecting apparatus 200 is detached from the holder 132, the handle 1325 is cocked, the two cam blocks 1328 release squeezing of the compressing block 1324, and the two clamping portions 1322 move oppositely. The fixed shaft 212 is loosened to take the laser-corner reflecting apparatus 20 down from the holder 132.

When the laser-corner reflecting apparatus 20 is mounted to the holder 132 with cooperation of the locating pin 213 with the locating hole 1326, it can be ensured that an emitting direction of laser emitted by the laser-corner reflecting apparatus 200 is perpendicular to the vertical rod 12, so that the laser emitted by the laser-corner reflecting apparatus 20 is horizontally emitted after the base body 110 is horizontally adjusted, to ensure that the on-board radar and the corner reflecting plate 22 are accurately aligned.

Figure 12:
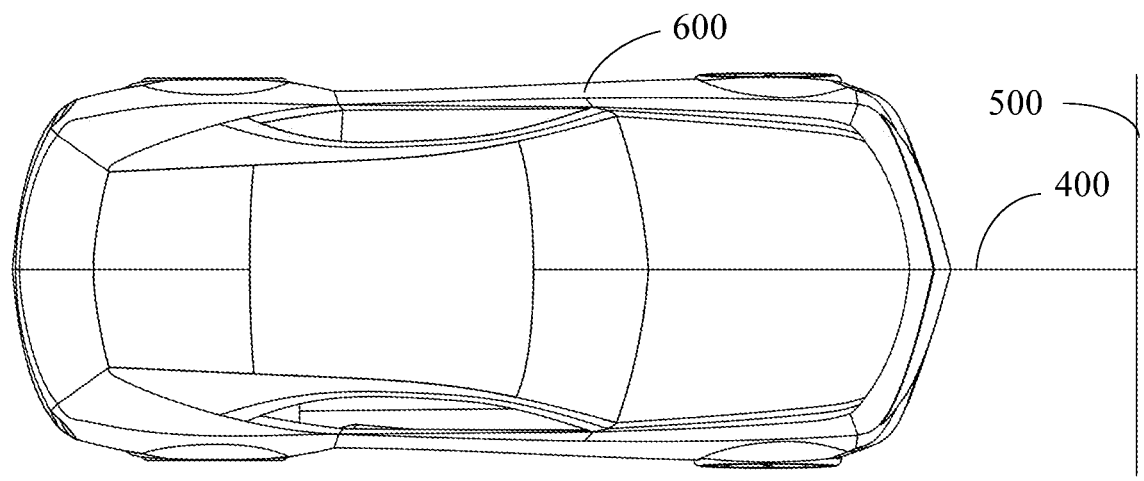
FIG. 12 is a schematic diagram of a projected center line of a calibrated center line of a body of a to-be-calibrated automobile and an equidistant line of a calibration distance that is perpendicular to the projected center line.

Referring to FIG. 12, when the on-board radar is calibrated using the laser-corner reflecting apparatus 200, first, a center line of a body of a to-be-calibrated automobile 600 is calibrated, and a projected center line 400 thereof is marked on the ground. In addition, according to a vehicle calibration requirement, an equidistant line 500 of a calibration distance that is perpendicular to the projected center line 400 is drawn.

Figure 13:
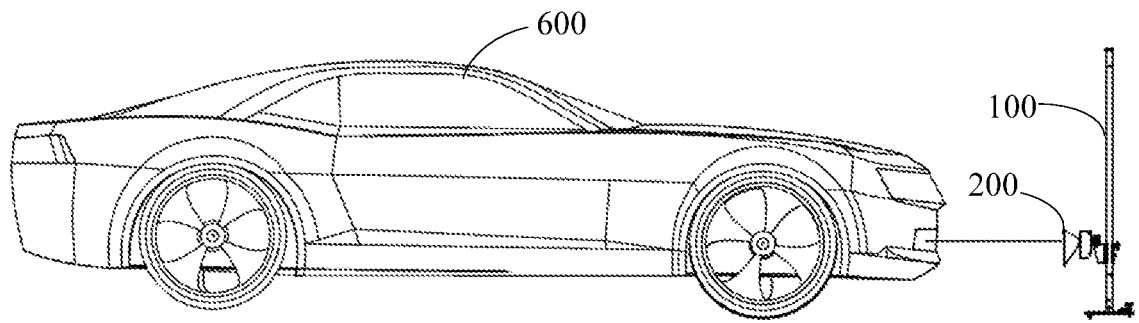
FIG. 13 to FIG. 14 are respectively schematic diagrams of different steps in which an on-board radar is calibrated using the laser-corner reflecting apparatus shown in FIG. 10 and FIG. 11.
Figure 14:
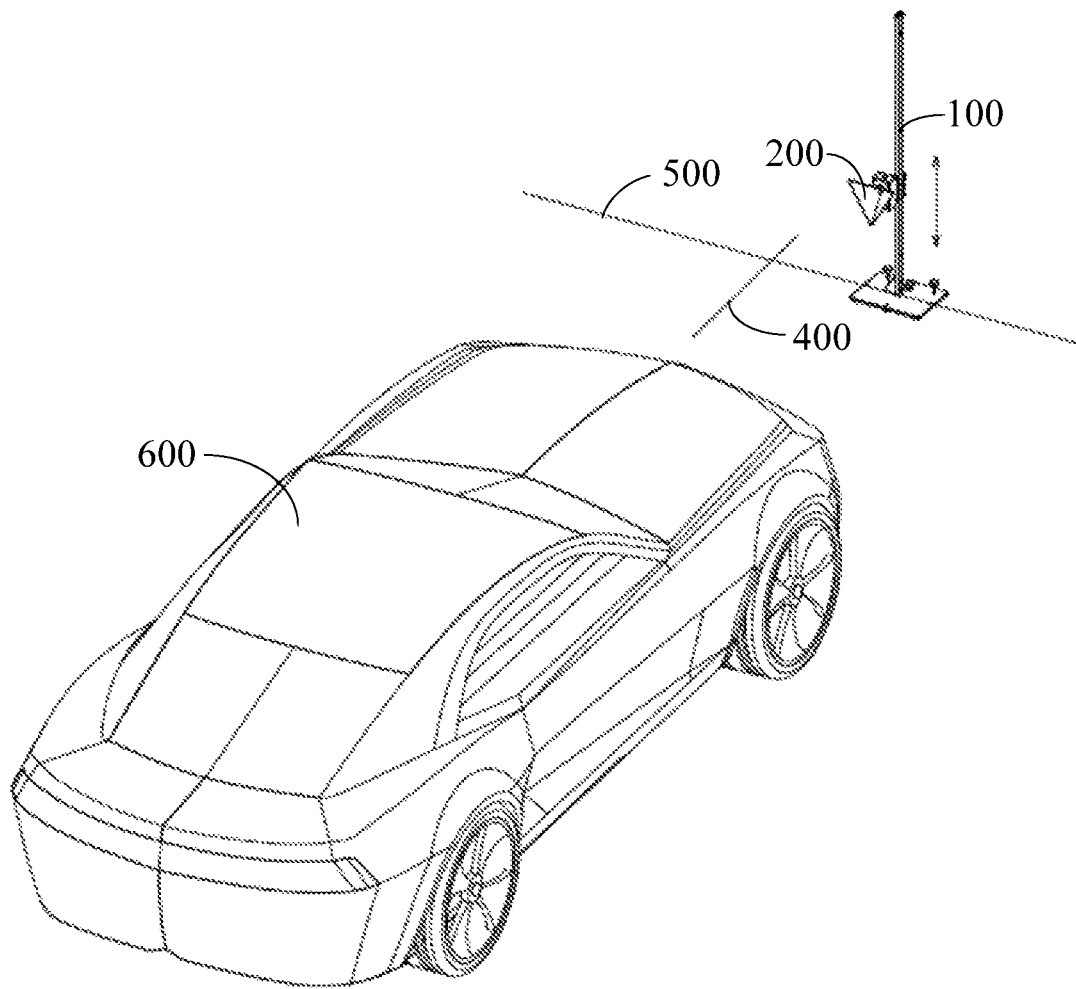

Referring to FIG. 3, FIG. 13, and FIG. 14 together, secondly, the laser-corner reflecting apparatus 200 directly faces a head of the to-be-calibrated automobile 600, and a first calibration line 1105 and a second calibration line 1106 of the base body 110 and the equidistant line 500 overlap. Left and right positions of the base body 110 are adjusted, so that the third calibration line 1107 and the projected center line 400 overlap, and the sliding assembly 13 is slid to adjust a height of the laser-corner reflecting apparatus 200, until a laser point can approximately irradiate a center of the on-board radar, that is, initial alignment of the laser-corner reflecting apparatus with the on-board radar is completed. The first calibration line 1105 and the second calibration line 1106 are kept to coincide with the equidistant line 500, and the third calibration line 1107 is kept to coincide with the projected center line 400. A horizontal adjustment member 113 on the base body 110 is adjusted to enable bubbles of the first horizontal bead 1140 and the second horizontal bead 1142 to be at central positions. In addition, a position of the laser point on the on-board radar is noticed, and the height and a horizontal position of the laser-corner reflecting apparatus 200 are adjusted through cooperation, until the laser point is also illuminated at a center of the on-board radar when the bubbles of the first horizontal bead 1140 and the second horizontal bead 1142 are located at the center of the horizontal bead. Therefore, accurate alignment of the laser-corner reflecting apparatus 200 and the on-board radar is completed. According to an actual calibration requirement, when the bracket apparatus 100 is kept motionless, the height of the laser-corner reflecting apparatus 200 on the bracket apparatus 100 may be adjusted to reflect the radar wave emitted by the on-board radar in different heights, to calibrate an installation position and an installation angle of the on-board radar.

Figure 15:
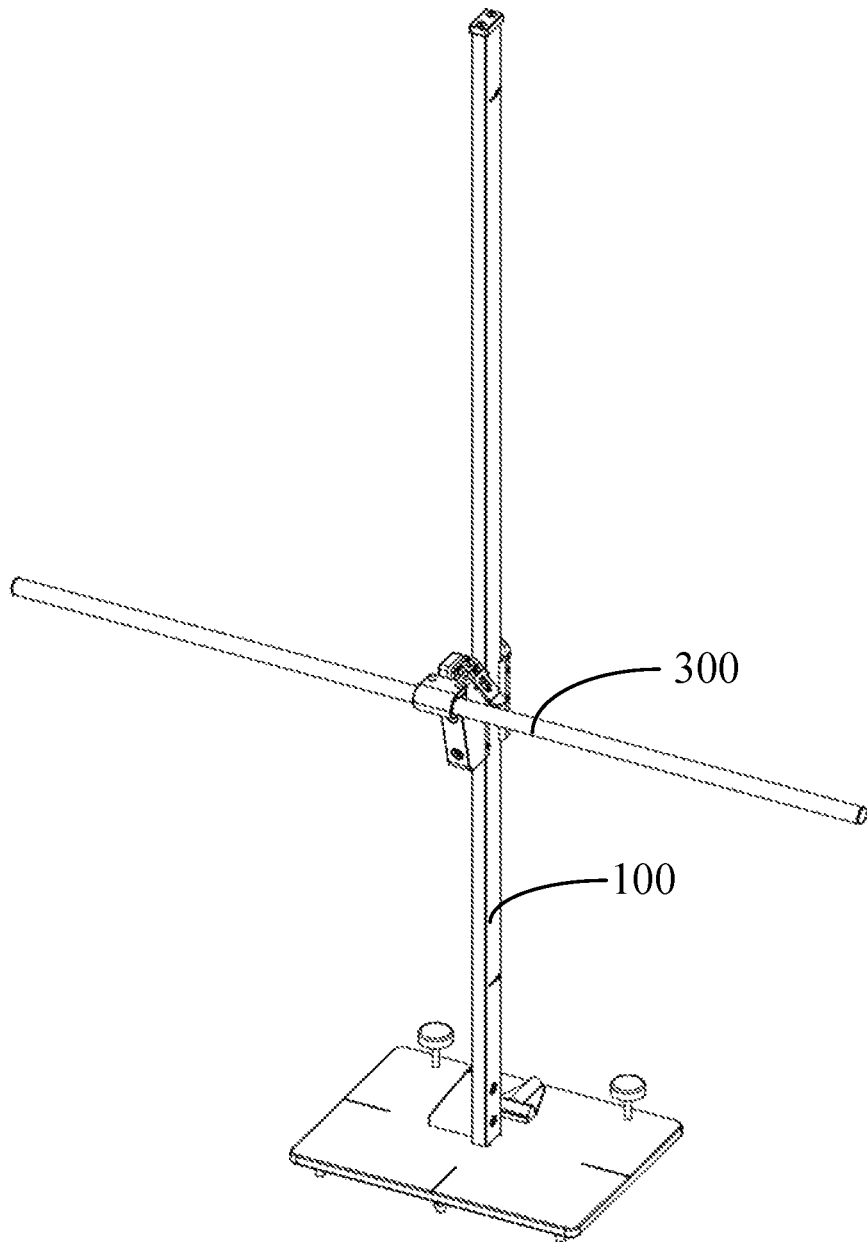
FIG. 15 is a three-dimensional diagram of a calibration member carried by a bracket apparatus shown in FIG. 1.

Referring to FIG. 15, the bracket apparatus 100 of this embodiment may be used to support a calibration member 300 of an on-board night-vision video recording apparatus, so as to calibrate the on-board night-vision video recording apparatus.

Figure 16:
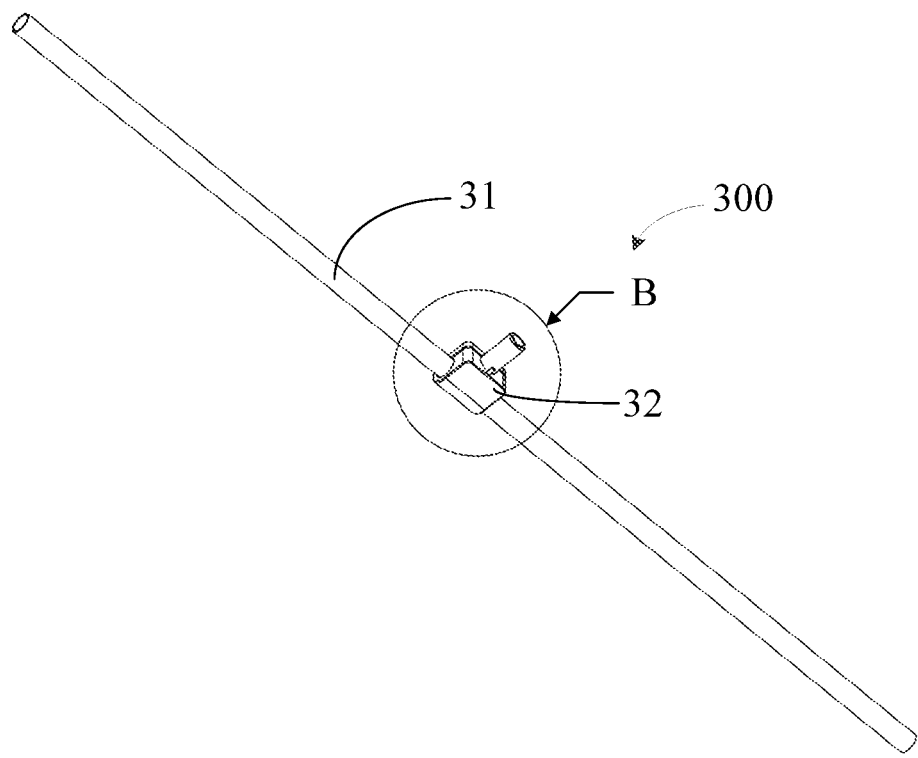
FIG. 16 is a three-dimensional diagram of a calibration member carried by a bracket apparatus shown in FIG. 15.
Figure 17:
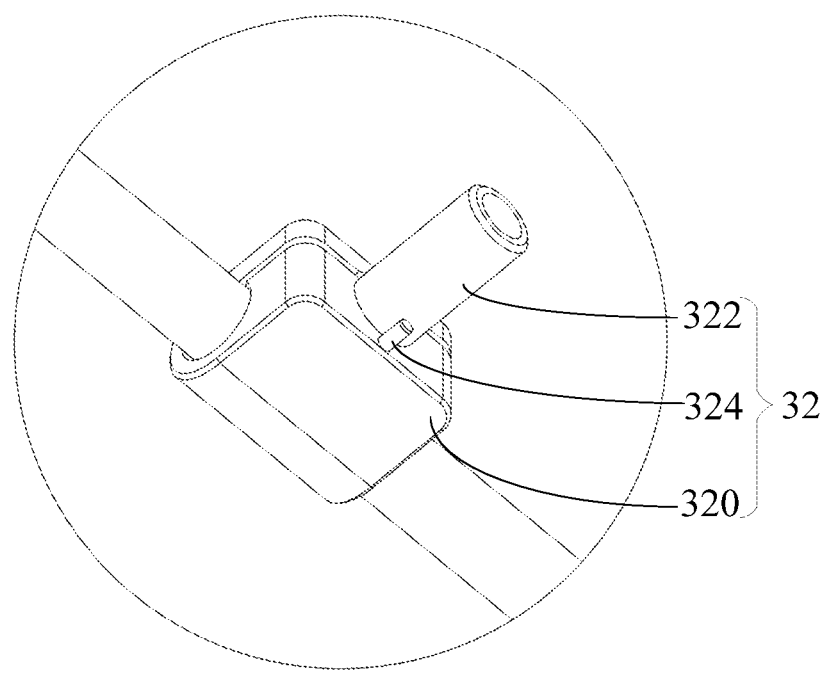
FIG. 17 is a partial enlarged diagram of a portion B in FIG. 16.

Referring to both FIG. 16 and FIG. 17, the calibration member 300 includes a calibration rod 31 and a fixed portion 32. The calibration rod 31 is a carbon fiber tube having a length of one meter, which has high collimation and coaxiality and is not easily deformed.

The fixed portion 32 is fixedly mounted to a central portion of the calibration rod 31. The fixed portion 32 includes a fixed portion body 320, a fixed shaft 322, and a locating pin 324. The fixed portion body 320 is sleeved on the calibration rod 31. One end of the fixed shaft 322 is fixedly connected to the fixed portion body 320, and one end of the locating pin 324 is also fixedly connected to the fixed portion body 320. Both the fixed shaft 322 and the locating pin 324 are cylindric, and the fixed shaft 322 and the locating pin 324 are parallel to each other and perpendicular to the calibration rod 31.

Referring to both FIG. 7 and FIG. 17, when the calibration member 300 is mounted to the holder 132, the fixed shaft 322 is inserted into the accommodating hole 1327, the locating pin 324 is inserted into the locating hole 1326. The handle 1325 is pressed to enable the two cam blocks 1328 to press against the compressing block 1324, so that the two clamping portions 1322 move toward each other, and the accommodating hole 1327 is narrowed to clamp the fixed shaft 322, so that the calibration rod 31 may be conveniently fixed to the holder 132.

When the calibration rod 300 is detached from the holder 132, the handle 1325 is cocked, the two cam blocks 1328 release squeezing of the compressing block 1324, and the two clamping portions 1322 move oppositely. The fixed shaft 322 is loosened to take the calibration member 300 down from the holder 132.

When the calibration member 300 is mounted to the holder 132 through cooperation of the locating pin 324 with the locating hole 1326, it can be ensured that the calibration rod 31 is perpendicular to the vertical rod 12, so as to ensure that the calibration rod 31 is horizontally disposed after the base body 110 is horizontally adjusted, providing an accurate horizontal reference line for the on-board night-vision video recording apparatus.

Referring to FIG. 12, when the on-board night-vision video recording apparatus is calibrated using the calibration member 300, first, a center line of a body of a to-be-calibrated automobile 600 is calibrated, and a projected center line 300 thereof is marked on the ground. In addition, according to a vehicle calibration requirement, an equidistant line 400 of a calibration distance that is perpendicular to the projected center line 300 is drawn.

Figure 18:
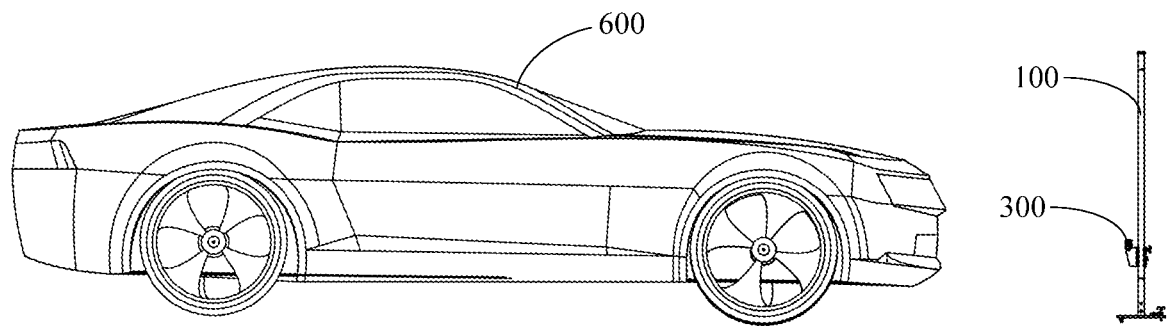
FIG. 18 to FIG. 19 are respectively schematic diagrams of different steps in which an on-board night-vision video recording apparatus is calibrated using the calibration member shown in FIG. 15 and FIG. 17.
Figure 19:
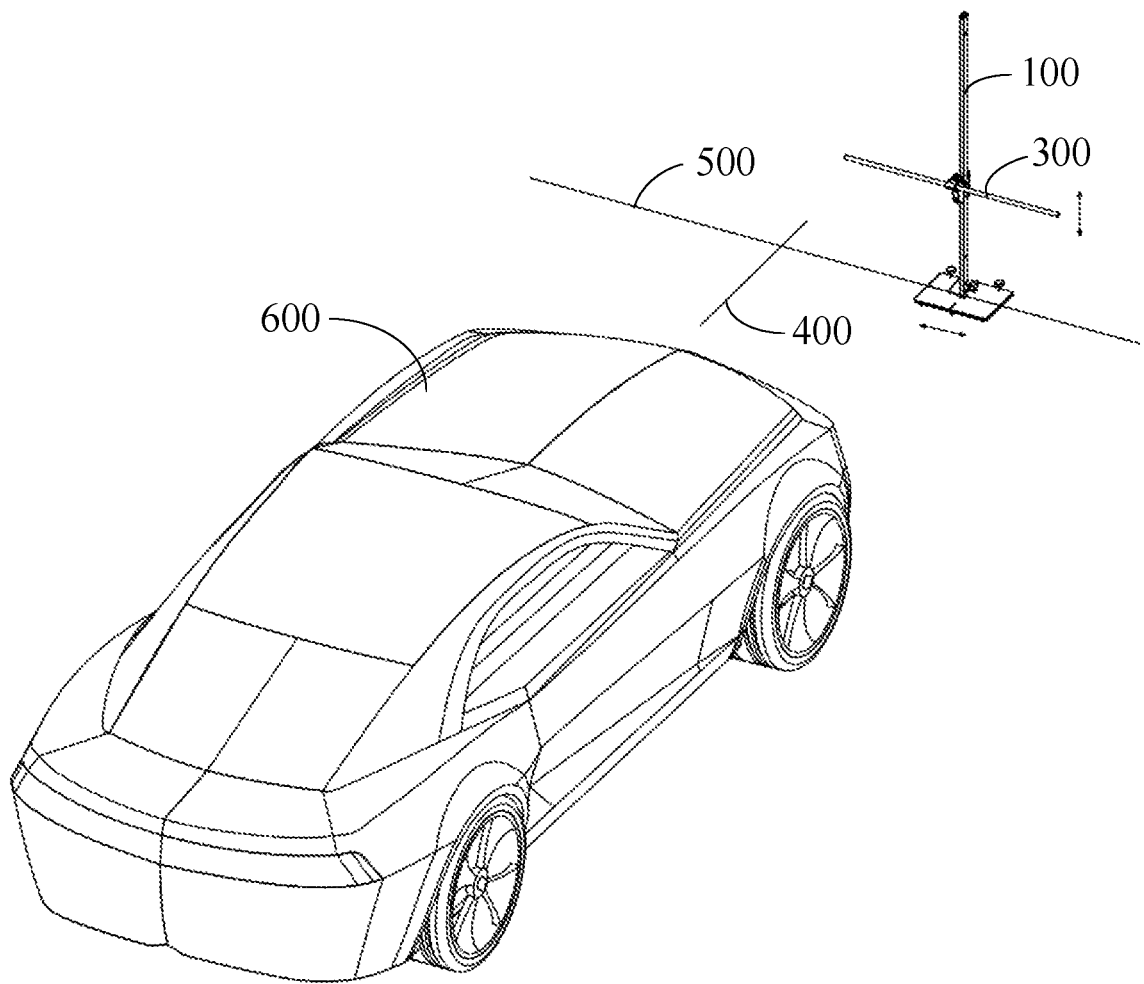

Referring to FIG. 3, FIG. 18, and FIG. 19 together, secondly, the calibration apparatus 300 is enabled to directly face a head of the to-be-calibrated automobile 600, and a first calibration line 1105 and a second calibration line 1106 of the base body 110 coincide with the equidistant line 500. According to a position of the night-vision video recording apparatus of the to-be-calibrated automobile 600, left and right positions of the base body 110 are adjusted, so that the third calibration line 1107 coincides with the projected center line 400. The sliding assembly 13 is slid to adjust a height of the calibration member 300, until the calibration rod 31 basically coincides with a horizontal line of a screen on an on-board night-vision display screen interface. Therefore, initial alignment of the calibration member 300 with the night-vision video recording apparatus is completed. The first calibration line 1105 and the second calibration line 1106 are kept to coincide with the equidistant line 500, the third calibration line 1107 is kept to coincide with the projected center line 400, and the horizontal adjustment member 113 of the base body 110 is adjusted, to enable bubbles of the first horizontal bead 1140 and the second horizontal bead 1142 to be located at middle positions. A height of the calibration rod 31 is adjusted, until a center of the calibration rod 31 coincides with a center of a horizontal line of the on-board display screen when bubbles of the first horizontal bead 1140 and the second horizontal bead 1142 are located at the center. When the calibration member 300 is kept motionless, depression and elevation angles of the night-vision video recording apparatus are adjusted, to enable the horizontal line of the on-board screen to completely coincide with the calibration rod 31, and therefore calibration of the night-vision video recording apparatus is completed.

In this embodiment, the bracket apparatus 100 fixes the laser-corner reflecting apparatus 200 and the calibration member 300 through the holder 132. It may be understood that, in some other embodiments, the sliding assembly 13 may change a structure of the holder thereof according to the requirements to fix calibration apparatuses with different structures.

In the embodiment of the present invention, the sliding assembly 13 may slide along the vertical rod 12, and a height of the calibration apparatus carried by the sliding assembly 13 may be adjusted as required, to meet different height requirements of different calibration apparatuses, so that the bracket apparatus 100 may carry different calibration apparatuses for use.

In addition, after the fixed shaft is inserted into the accommodating hole 1327, and the clamping portion 1322 clamps a structure of the fixed shaft, the calibration apparatus with the fixed shaft may be conveniently and rapidly mounted to the holder 132 or detached from the holder 132. In addition, after the locating pin is inserted into the locating hole 1326, it can be ensured that a calibration apparatus with the locating pin is mounted to a preset position.

Furthermore, with the self-locking member 134, the height of the sliding assembly 13 may be adjusted by a large stroke, or the height of the sliding assembly 13 may be fine adjusted, so as to flexibly meet different use requirements.

Finally, the third calibration line 1107 is disposed on the base body 110 to facilitate alignment of the bracket apparatus 100 with a center line of the automobile body on a projected center line 400 on the ground. At least one of the first calibration line 1105 and the second calibration line 1106 is disposed on the base body 110 to facilitate alignment of the bracket apparatus 100 with the equidistant line 500, thereby making preparation for accurate calibration of the calibration apparatus carried by the bracket apparatus 100. In addition, the central axis of the locating hole 1326 and the central axis of the accommodating hole 1327 are both parallel to the third calibration line 1107, and the central axis of the locating hole 1326, the central axis of the accommodating hole 1327, and the third calibration line 1107 are located in a same vertical plane. When the third calibration line 1107 is aligned with the projected center line 400, the calibration apparatus may be easily aligned with the center line of the to-be-calibrated automobile 600, for example, the laser-corner reflecting apparatus 200 or the calibration member 300 is aligned with the center line of to-be-calibrated automobile 600.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A bracket apparatus, comprising a base, a vertical rod, and a sliding assembly; wherein
   the base supports the vertical rod;
   the vertical rod is disposed vertically, one end thereof being mounted to the base;
   the sliding assembly is movably mounted to the vertical rod and may slide along the vertical rod, and the sliding assembly is configured to carry a required calibration apparatus;
   an accommodating hole is disposed for the sliding assembly for accommodating a fixed shaft of the calibration apparatus;
   the sliding assembly comprises a holder, the holder comprising a holder body, a clamping portion, a connecting rod, and a handle;
   two clamping portions extend from the holder body, an accommodating hole is disposed between the two clamping portions, and there is a gap between the two clamping portions, the gap being in communication with the accommodating hole;
   one end of the connecting rod penetrates through one clamping portions and is fixed to the other clamping portion, and the other end of the connecting rod is hinged on the handle; and
   a cam block and a rotation shaft are disposed on the handle, one end that is of the connecting rod and that is away from the clamping portion is connected to the rotation shaft, two cam blocks are sleeved on both ends of the rotation shaft, and the two cam blocks may rotate relative to the rotation shaft, to press against the clamping portion, so that the two clamping portions clamp the fixed shaft.

2. The bracket apparatus according to claim 1, wherein a locating hole is disposed on the sliding assembly for accommodating a locating pin of the calibration apparatus.

3. The bracket apparatus according to claim 1, wherein the holder comprises a compressing block, the compressing block being sleeved on the connecting rod, and the compressing block being located between the clamping portion and the cam block.

4. The bracket apparatus according to claim 1, wherein the sliding assembly comprises a clamping member, the clamping member being sleeved on the vertical rod and sliding along the vertical rod, and the clamping member clamping the vertical rod to fix the sliding assembly to a required position.

5. The bracket apparatus according to claim 4, wherein a rack is further disposed on the vertical rod, the rack being disposed along a vertical direction;
   the sliding assembly comprises a self-locking member, the self-locking member comprising a fine adjustment knob and an adjusting gear; wherein
   the fine adjustment knob is movably mounted to the clamping member, and the fine adjustment knob may rotate relative to the clamping member; and
   the adjusting gear is sleeved on the fine adjustment knob, and the adjusting gear is meshed with the rack to fine adjust a height of the sliding assembly.

6. The bracket apparatus according to claim 5, wherein the self-locking member comprises a fixed rotation shaft, a pressing plate, and an elastic member; wherein
   both ends of the fixed rotation shaft are respectively fixedly mounted to the clamping member, and a central axis of the fixed rotation shaft is parallel to a rotational axis of the fine adjustment knob;
   the pressing plate is sleeved on the fixed rotation shaft and the fine adjustment knob, the pressing plate may rotate around the fixed rotation shaft for driving the fine adjustment knob to move relative to the clamping member, so that the gear is separated from the rack; and
   the elastic member is compressed between the pressing plate and the clamping member, to provide recovery elasticity for the pressing plate, so that the adjusting gear compresses the rack.

7. The bracket apparatus according to claim 6, wherein the pressing plate comprises a pressing plate body and a mounting ear;
   two mounting ears extending from the pressing plate body, and the pressing plate body being sleeved on the fixed rotation shaft; and
   the two mounting ears being sleeved on the fine adjustment knob, and the adjusting gear being located between the two mounting ears.

8. The bracket apparatus according to claim 5, wherein the clamping member comprises a first clamping plate, a second clamping plate, and a locking knob;
   the first clamping plate and the second clamping plate being respectively located at two opposite sides of the vertical rod and respectively abutting against the vertical rod; and one end of the locking knob penetrating through the first clamping plate, and the locking knob being engaged with the first clamping plate through threads, and when the locking knob is rotated, the locking knob penetrating through one end of the first clamping plate and abutting against the vertical rod, so that the clamping member is fixed to the vertical rod.

9. The bracket apparatus according to claim 8, wherein the clamping member comprises a friction pad and a pad screw;

the friction pad being disposed between the first clamping plate and the vertical rod for increasing friction between the first clamping plate and the vertical rod; and one end of the pad screw penetrating through the first clamping plate and abutting against the friction pad, and when the pad screw is rotated, a degree of contact between the friction pad and the vertical rod being adjusted to adjust friction between the friction pad and the vertical rod.

10. The bracket apparatus according to claim 1, wherein the base comprises a base body, a horizontal adjustment member, and a gradienter;

one end of the vertical rod being fixedly mounted to the base body;

the horizontal adjustment member being mounted to the base body for adjusting a horizontal angle of the base body; and the gradienter being mounted to the base body for detecting whether the base body is horizontally disposed.

11. The bracket apparatus according to claim 10, wherein the base comprises a supporting member, one end of the supporting member being fixedly mounted to a lower surface of the base body, and there being at least one supporting member, wherein one intersection point formed through intersection of one of the supporting members and the lower surface and two intersection points formed respectively through intersection of the two horizontal adjustment members and the lower surface are respectively located at three vertexes of an isosceles triangle.

12. The bracket apparatus according to claim 11, wherein there are three supporting members, the three supporting members being arranged orderly along a first straight line; and two horizontal adjusting members are arranged orderly along a second straight line, the first straight line being parallel to the second straight line.

13. The bracket apparatus according to claim 10, wherein the horizontal adjustment member comprises a handle and a screw portion;

the handle being fixedly mounted to one end of the screw portion, and the handle being located over the base body to facilitate rotation of the horizontal adjustment member; and the screw portion penetrating through the base body, the screw portion being engaged with the base body through threads, and the screw portion being vertically disposed.

14. The bracket apparatus according to claim 10, wherein there are at least three horizontal adjustment members, the three horizontal adjustment members respectively intersecting a lower surface of the base body to form three intersection points, and the three intersection points being respectively located at three vertexes of an isosceles triangle.

15. The bracket apparatus according to claim 10, wherein the gradienter is mounted to an upper surface of the base body, and the gradienter comprises a first horizontal bead and a second horizontal bead, the first horizontal bead being perpendicular to the second horizontal bead.

16. The bracket apparatus according to claim 10, wherein a first calibration line, a second calibration line, and a third calibration line are disposed on the upper surface of the base body;

the first calibration line and the second calibration line being located on a same straight line; and the third calibration line being perpendicular to the first calibration line and the second calibration line, and a straight line on which the third calibration line is located passing through an intersection point of the vertical rod and the base body.

17. The bracket apparatus according to claim 10, wherein a first calibration line and a third calibration line are disposed on the upper surface of the base body; and the third calibration line is perpendicular to the first calibration line, and a straight line on which the third calibration line is located passes through an intersection point of the vertical rod and the base body.

18. The bracket apparatus according to claim 16, wherein the third calibration line is parallel to a central axis of the accommodating hole, and the third calibration line and the central axis of the accommodating hole are located in a same vertical plane.

19. The bracket apparatus according to claim 1, wherein a height gauge is disposed for the vertical rod for measuring a moving distance or a height of the sliding assembly.

* * * * *